US012586485B2

(12) United States Patent
Hsu et al.

(10) Patent No.: US 12,586,485 B2
(45) Date of Patent: Mar. 24, 2026

(54) SYSTEMS AND METHODS FOR GENERATING LYRICS AND CHORDS FOR USER INTERFACES

(71) Applicant: MOISES SYSTEMS, INC., Salt Lake City, UT (US)

(72) Inventors: Eddie Gueiros Hsu, João Pessoa (BR); Bruno Maia De Morais, João Pessoa (BR); Felipe Alves Araujo, João Pessoa (BR); Emir Demirel, London (GB); Felipe Honorato de Sousa, João Pessoa (BR)

(73) Assignee: MOISES SYSTEMS, INC., Salt Lake City, UT (US)

( * ) Notice: Subject to any disclaimer, the term of this patent is extended or adjusted under 35 U.S.C. 154(b) by 0 days.

(21) Appl. No.: 19/217,335

(22) Filed: May 23, 2025

(65) Prior Publication Data

US 2025/0363910 A1      Nov. 27, 2025

Related U.S. Application Data

(60) Provisional application No. 63/651,737, filed on May 24, 2024.

(51) Int. Cl.
G09B 15/00      (2006.01)
G06F 3/16      (2006.01)
(Continued)

(52) U.S. Cl.
CPC ........... G09B 15/002 (2013.01); G06F 3/165 (2013.01); G10G 1/00 (2013.01); G10H 1/0008 (2013.01);
(Continued)

(58) Field of Classification Search
CPC ........ G09B 15/002; G06F 3/165; G10G 1/00; G10H 1/0008; G10H 2210/571; G10H 2220/011
See application file for complete search history.

(56) References Cited

U.S. PATENT DOCUMENTS

| | | | | |
|---|---|---|---|---|
| 11,245,950 | B1 * | 2/2022 | Mahar | ..................... G10L 15/26 |
| 2018/0374461 | A1 * | 12/2018 | Serletic | ............... H04N 9/8211 |
| 2021/0409466 | A1 | 12/2021 | Scott et al. | |

FOREIGN PATENT DOCUMENTS

| | | | | |
|---|---|---|---|---|
| CN | 111639226 A | | 9/2020 | |
| CN | 112150997 A | * | 12/2020 | ............. G10L 25/03 |

(Continued)

OTHER PUBLICATIONS

International Search Report and Written Opinion received for PCT Patent Application No. PCT/US2025/030849, mailed on Jul. 28, 2025, 12 pages.

*Primary Examiner* — Jeffrey Donels
(74) *Attorney, Agent, or Firm* — Workman Nydegger

(57) ABSTRACT

A system is configurable to generate a set of lyric labels by processing audio content using a first machine learning model, wherein each lyric label of the set of lyric labels is associated with a respective lyric label timestamp; generate a set of chord labels by processing the audio content using a second machine learning model, wherein each chord label of the set of chord labels is associated with a respective chord label timestamp; determine a matching lyric label from the set of lyric labels for at least one chord label of the set of chord labels based on temporal similarity of the respective chord label timestamp of the at least one chord label to the respective lyric label timestamp of the matching lyric label; and generate a display comprising lyric content and chord content that visually correlate the matching lyric label with the at least one chord label.

19 Claims, 6 Drawing Sheets

(51) Int. Cl.
G10G 1/00 (2006.01)
G10H 1/00 (2006.01)

(52) U.S. Cl.
CPC . *G10H 2210/571* (2013.01); *G10H 2220/011*
(2013.01)

(56) References Cited

FOREIGN PATENT DOCUMENTS

| | | | | | | |
|----|------------------|----|---|---------|-------------|------------|
| CN | 116157859 | A | * | 5/2023 | ............... | G10H 1/36 |
| EP | 4270373 | A1 | * | 11/2023 | ........... | G10H 1/0008 |
| WO | WO-2021090256 | A1 | * | 5/2021 | ........... | H04L 69/169 |

* cited by examiner

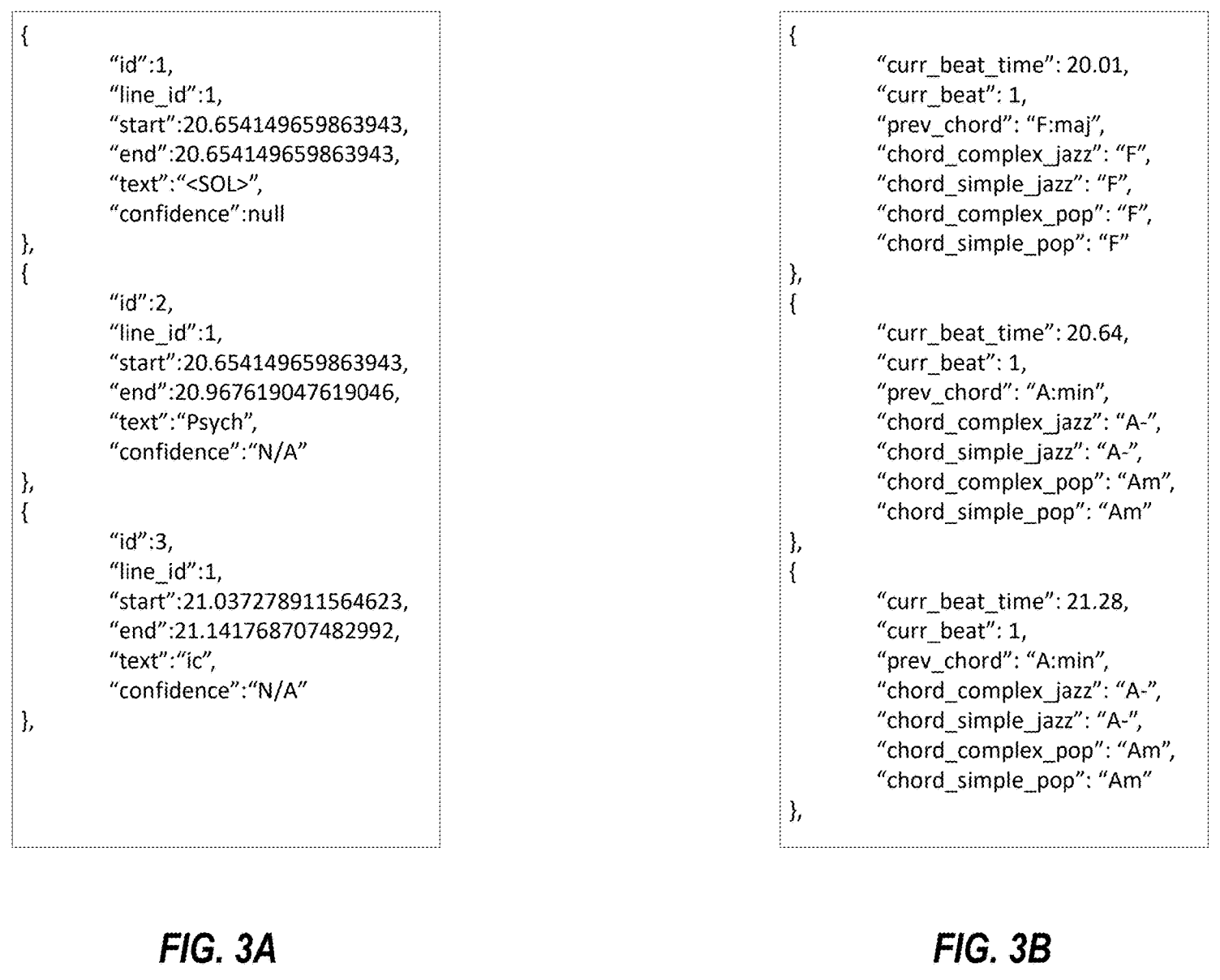

```
{
    "id":1,
    "line_id":1,
    "start":20.65414965986943,
    "end":20.65414965986943,
    "text":"<SOL>",
    "confidence":null
},
{
    "id":2,
    "line_id":1,
    "start":20.65414965986943,
    "end":20.967619047619046,
    "text":"Psych",
    "confidence":"N/A"
},
{
    "id":3,
    "line_id":1,
    "start":21.03727891156462,
    "end":21.141768707482992,
    "text":"ic",
    "confidence":"N/A"
},
```

FIG. 3A

```
{
    "curr_beat_time":20.01,
    "curr_beat":1,
    "prev_chord":"F:maj",
    "chord_complex_jazz":"F",
    "chord_simple_jazz":"F",
    "chord_complex_pop":"F",
    "chord_simple_pop":"F"
},
{
    "curr_beat_time":20.64,
    "curr_beat":1,
    "prev_chord":"A:min",
    "chord_complex_jazz":"A-",
    "chord_simple_jazz":"A-",
    "chord_complex_pop":"Am",
    "chord_simple_pop":"Am"
},
{
    "curr_beat_time":21.28,
    "curr_beat":1,
    "prev_chord":"A:min",
    "chord_complex_jazz":"A-",
    "chord_simple_jazz":"A-",
    "chord_complex_pop":"Am",
    "chord_simple_pop":"Am"
},
```

SYSTEMS AND METHODS FOR GENERATING LYRICS AND CHORDS FOR USER INTERFACES

CROSS-REFERENCE TO RELATED APPLICATIONS

This application claims priority to and the benefit of U.S. Provisional Patent Application No. 63/651,737, filed on May 24, 2024, and entitled SYSTEMS AND METHODS FOR GENERATING LYRICS AND CHORDS FOR USER INTERFACES, the entirety of which is incorporated herein by reference for all purposes.

BACKGROUND

Many musicians engage in practice sessions in which they play their musical instrument(s) and/or sing while listening to a song. Such practice strategies can help musicians refine their skills and promote engagement with music (e.g., in preparation for performances). However, engaging in such practice sessions can be challenging for musicians. For instance, many musicians, especially novice musicians, have difficulty in determining which musical notes or chords are being played in a pre-recorded song at any given moment, which can hinder the musician's ability to practice alongside playback of the pre-recorded song. Furthermore, musicians can find difficulty in aligning their own rhythm and tempo with that of a pre-recorded song, which can necessitate numerous repetitions for the musician to achieve alignment with the pre-recorded song.

The subject matter claimed herein is not limited to embodiments that solve any challenges or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3A illustrates a representation of example output of a first machine learning model for generating lyric labels and corresponding timestamps.

FIG. 3B illustrates a representation of example output of a first machine learning model for generating lyric labels and corresponding timestamps.

DETAILED DESCRIPTION

Figure 1:
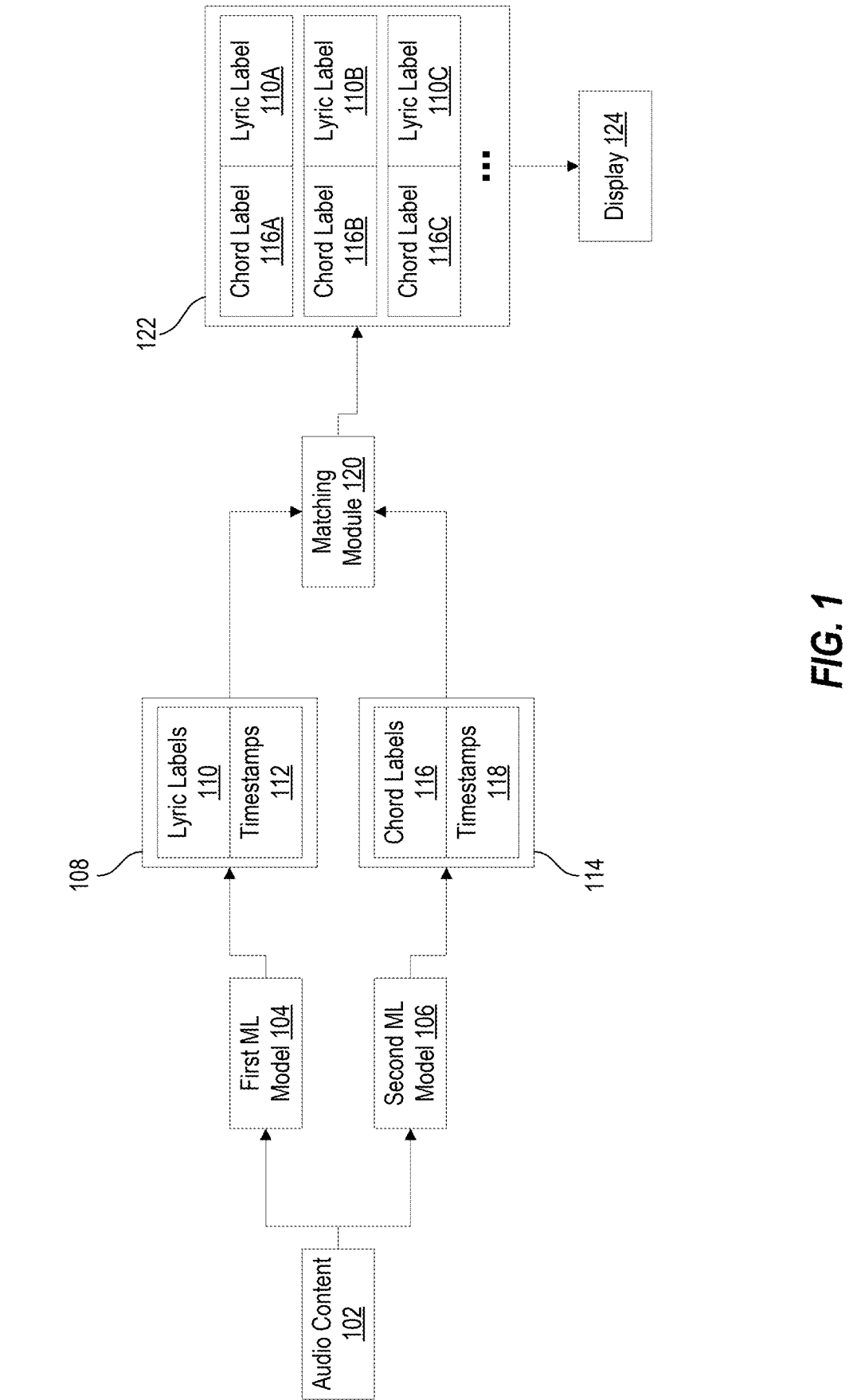
FIG. 1 illustrates an example flow diagram depicting operations and/or data objects/elements associated with generating temporally correlated chord and lyric content for display on a user interface frontend.

Disclosed embodiments are directed to systems, devices, and techniques for generating and/or presenting lyrics and chords for a user interface.

As noted above, many musicians encounter difficulties and/or challenges when engaging in practice sessions that involve playing their musical instrument(s) alongside playback of a pre-recorded song. Although some challenges can be at least partially ameliorated by use of sheet music, the acquisition of sheet music for a practice session can itself present a hurdle for many musicians.

At least some disclosed embodiments are directed to systems and methods for generating lyric and chord information from audio signals (e.g., represented in audio files, streams, or other sources) and displaying correlated lyric and chord information at a user interface frontend. The lyric and chord information can be presented in a manner that temporally aligns (or visually correlates) the chord information with the lyric information, which can enable users to easily visually ascertain when chords are to be played relative to the lyrics of a song. Such functionality can address many challenges that users face when attempting to practice a musical instrument alongside playback of a song.

At least some disclosed embodiments utilize at least two machine learning models. Both models receive and process audio file (or other representation of an audio signal) uploaded or designated by the user. The first machine learning model can be configured to output lyrics (or lyric labels) detected in the audio file with associated timestamps (e.g., indicating the time at which words are uttered in the audio file). The second machine learning model can be configured to output chords (or chord labels) detected in the audio file with associated timestamps (e.g., indicating the time at which chords are played in the audio file). A matching module can be used to compare the timestamps associated with the lyrics to the timestamps associated with the chords to determine temporal alignment of the chords and the lyrics. Once the lyrics and chords are appropriately matched or aligned, a visualization can be generated that includes the matched lyrics and chords, and the visualization can be displayed on the user interface.

The generated user interface that visually correlates temporally aligned chords with lyrics can provide a simple and seamless user experience. For example, the user may upload a song or audio file (e.g., to a server) or use a pre-stored file. Once the audio file is available (e.g., at the server), the user interface can provide the user with the option to initiate processing of the audio file to generate the lyrics and chords (e.g., via the selection of a user interface element). Once generated, the user interface can present the lyrics and chords on the display of the device executing the user interface. The user interface may further provide the user with the ability to save and access past generated lyrics and chords for other audio files.

Additionally, the user interface may provide the user with options to give feedback to be used as future training data for one or both of the machine learning models. The user interface may allow users the ability to adjust the lyrics and/or chords as necessary or provide feedback through a binary rating system, a more complex rating system, message box, or other feedback mechanisms.

Having just described some of the various high-level features and benefits of the disclosed embodiments, attention will now be directed to the Figures, which illustrate various conceptual representations, architectures, methods, and/or supporting illustrations related to the disclosed embodiments.

Figure 2:
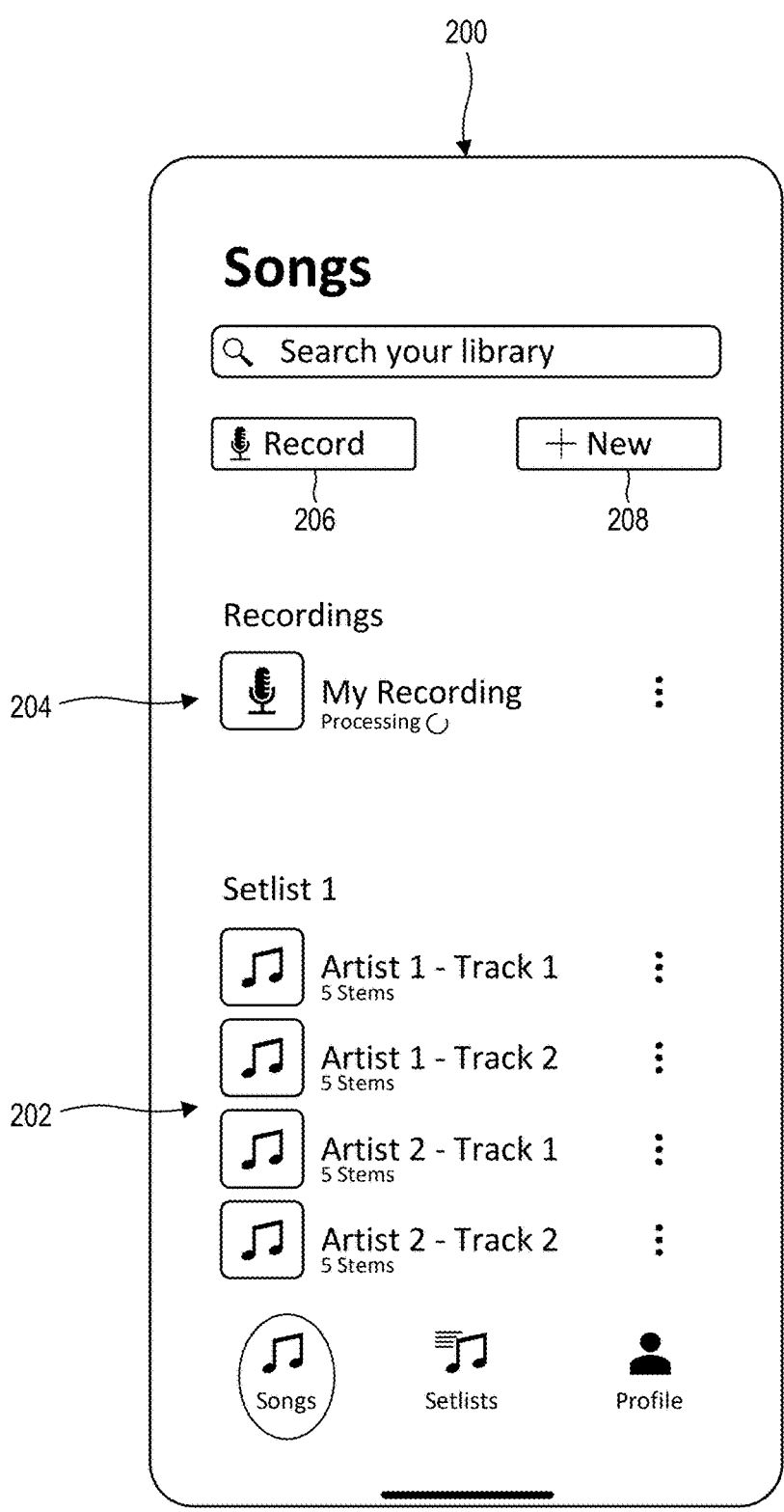
FIG. 2 illustrates a user interface for facilitating selection of audio content for processing.

FIG. 1 illustrates an example flow diagram 100 depicting operations and/or data objects/elements associated with generating temporally correlated chord and lyric content for display on a user interface frontend. Flow diagram 100 depicts audio content 102 (e.g., one or more audio signals), which may comprise one or more locally and/or remotely stored audio or recording files. FIG. 2 illustrates a user interface 200 for facilitating selection of audio content for processing. One or more aspects of the user interface 200 (and other user interfaces frontends described herein) can be presented on various types of devices or systems, such as smartphones, tablets, laptop computers, desktop computers, wearable devices, and/or other devices (e.g., which devices or systems can correspond to or include components of system 00, described hereinafter with reference to FIG. 6). The user interface 200 can be presented on a user device in association with operation of a downloaded and/or web-based (e.g., server- or cloud-based) application (e.g., a music software application).

In the example shown in FIG. 2, the user interface 200 provides access to various audio content (e.g., corresponding to audio content 102) in the form of audio tracks 202 and audio recordings 204. The audio content may comprise one or more locally and/or remotely stored audio or recording files. The audio content can include data/information allowing for playback of associated audio when used in conjunction with a playback device. In some instances, selected audio content may comprise an audio stream (e.g., provided by a web streaming service, radio-based service, satellite service, line-in connection, etc.). In some implementations audio content may be added to the audio tracks 202 and/or the audio recordings 204 displayed in the user interface 200 via one or more user actions. For example, the user interface 200 includes a record button 206 and an add button 208. The record button 206 may be selectable via user input to facilitate recording of an audio file for inclusion with the audio recordings 204. Similarly, the add button 208 may be selectable via user input to facilitate selection of additional audio files/tracks (e.g., from a local or remote repository, or by selecting one or more music streaming or radio or other audio services) for inclusion with the audio tracks 202.

In some instances, the audio content represented in a user interface 200 includes one or more audio stems. For example, each of the audio tracks 202 are displayed in conjunction with an indicator of the quantity of audio stems (e.g., "5 Stems") associated with the respective audio track. Audio stems can refer to the component parts of a complete musical track, such as vocals, drums, bass, guitar, keys/piano, and/or other sources of audio.

In the example shown in FIG. 2, the audio recordings 204 includes a newly recorded file referred to herein as "My Recording". My Recording may have been recorded after selection of the record button 206 of the user interface 200. The user interface 200 of FIG. 2 conceptually depicts processing of the My Recording file with the "Processing" label proximate to the My Recording label. The processing of audio content as indicated in FIG. 2 can comprise performing stem separation (e.g., to isolate individual audio stems represented in the audio content from one another). The processing of the audio content can additionally or alternatively include generating temporally correlated chord and lyric content for display on a user interface frontend, and/or other audio processing operations.

In one example, after selection of audio content shown in the user interface 200 (or after selection of audio content to add to the user interface 200), the audio content may be processed (e.g., via local computing resources, such as those of a client device/system, and/or via remote resources, such as cloud or server resources) to determine the chord and lyric labels for the selected audio content. The chord and lyric labels can be represented as one or more data objects, files, or structures in which the lyrics, chord names, and/or associated timestamps (e.g., denoting the beginnings, ends, and/or durations of the associated lyrics and/or chord names along the timeline of the selected audio content) are recorded or logged. In some implementations, the data object, file, or structure that indicates the timestamps of the chord and/or lyric labels comprises, provides a basis for, or is used to generate metadata that can be associated with the selected audio content (e.g., via embedding, packaging, attaching, indexing, coupling, inclusion in a metadata directory, pairing or key-value pairing, or other techniques).

Pursuant to generating temporally correlated chord and lyric content for display on a user interface frontend, FIG. 1 conceptually depicts the audio content 102 being processed by a first machine learning model 104 and a second machine learning model 106. In the example shown in FIG. 1, the first machine learning model 104 is configured to perform lyric recognition on the audio content 102, while the second machine learning model 106 is configured to perform chord recognition on the audio content 102. The first machine learning model 104 and/or the second machine learning model 106 can be implemented in various forms using various types of architectures, such as recurrent neural networks (RNNs), transformers, deep neural networks (DNNs), convolutional neural networks (CNNs), hybrid models, probabilistic models, attention-based models, and/or others. The audio content 102 may be processed by the first machine learning model 104 and second machine learning model 106 in series or at least partially in parallel. Although the examples discussed herein differentiate the operations associated with the first machine learning model 104 and the second machine learning model 106 as being performed by different modules, the operations discussed may be performed by a single or more than two modules. For instance, the first machine learning model 104 (or operations associated therewith) may be performed using two separate models: one for performing lyric transcription and one for aligning the lyrics or determining the timings of the lyrics. As another example, the operations associated with both the first machine learning model 104 and the second machine learning model 106 may be performed using a single AI module. In some implementations, lyric label timestamps are obtained via forced-alignment techniques (e.g., aligning lyric labels to audio features, such as feature vectors output by an acoustic model). In some implementations, lyric label timestamps are directly predicted by the language model (e.g., the first machine learning model).

In some implementations, the first machine learning model 104 can be configured to generate text representations of the lyrics within the audio content 102 using a combination of acoustic modeling and language modeling. The acoustic model can be responsible for generating a sequence of feature vectors that capture key sound characteristics from the audio content 102, such as frequency content and temporal patterns. The acoustic model can comprise a neural network architecture, such as a convolutional neural network (CNN) for initial feature extraction, followed by recurrent neural networks (RNNs) or transformers for sequence modeling. Other architectures are possible, such as convolutional recurrent neural networks (CRNNs) or fully transformer-based models. The language model can be configured to ensure that the recognized text aligns with natural language and can utilize recurrent neural networks, transformers, pre-trained large language models that are fine-tuned on lyric-specific data, and/or others. In some implementations, the language model is integrated using beam search decoding or other probabilistic decoding strategies that balance acoustic and linguistic probabilities. The first machine learning model 104 may be trained using supervised learning, where the model is trained on paired audio-text datasets that may comprise audio tracks paired with corresponding transcriptions of the lyrics. The training dataset may be augmented to improve model robustness, such as by adding noise, varying playback speed, or using data augmentation techniques that simulate different recording conditions. The model training may utilize various loss functions, such as connectionist temporal classification (CTC), cross-entropy, and/or others. Fine-tuning on genre-specific data, artist-specific data, language-specific data, etc., can be performed to enhance model accuracy for specific use cases. The first machine learning model 104 may be evaluated using metrics such as word error rate (WER) or character error rate (CER), and it may be further refined using transfer learning or domain adaptation techniques. FIG. 1 conceptually depicts output 108 of the first machine learning model 104, including lyric labels 110 and lyric label timestamps 112. The first machine learning model may be trained to predict various types of lyric labels 110 (and corresponding timestamps), such as words, phonemes, characters, and/or other sub-word units (in one or more languages), which may be represented in a tokenized form.

FIG. 3A illustrates a representation of example output 108 of the first machine learning model 104, with each separate lyric label 110 and associated lyric label timestamp 112 being separated by braces. For instance, each of the lyric labels includes a respective identifier or index element, shown in FIG. 3A as "id": 2 for one lyric label and "id": 3 for another lyric label. In the example shown in FIG. 3A, lyric label "id": 2 is associated with a syllable-level label "Psych" (indicated by "text": "Psych"), and lyric label "id": 3 is associated with the syllable-level label "ic" (indicated by "text": "ic"), which together form the word "Psychic". The lyric labels output by the first machine learning model 104 can include various components and/or take on various forms, such as syllable-level labels, word-level labels, phoneme-level labels, and associated identifier elements.

FIG. 3A furthermore illustrates that the output of the first machine learning model 104 can include timestamp information (e.g., lyric label timestamps) associated with each lyric label. In the example shown in FIG. 3A, the timestamp information may include a start time and an end time (e.g., indicated by "start"; and "end": labels in association with the different lyric identifiers/labels). For instance, FIG. 3A shows lyric label "id": 2 associated with a start time of about 20.65 seconds and an end time of about 20.97 seconds and shows lyric "id": 3 associated with a start time of about 21.04 seconds and an end time of about 21.14 seconds. In other embodiments, the timestamp may be represented by a start time, an end time, a middle or center timestamp, a duration, an ordering/index (e.g., "lyric 1", "lyric 2", etc.) and/or other representations.

In some embodiments, the first machine learning model 104 may output additional or alternative information associated with each extracted lyric label, such as a line identifier (indicated in FIG. 3A by "line_id"), confidence (indicated in FIG. 3A by "confidence"), and/or others. The confidence may comprise a confidence score (e.g., within a range of 0 to 1) indicating the confidence that the output lyric label is correct (e.g., according to the input audio and the past context transcribed). Confidence output may be associated with words, sub-word units, entire lines or segments of lyrics, etc. The first machine learning model can be configured to output tags or labels identifying speakers (e.g., singers/performers) associated with detected lyrics (e.g., for detected words, sub-word units, entire lines or segments of lyrics, etc.). In some embodiments, the first machine learning model 104 is configured to output identifiers indicating the beginning or end of sentences or lyric lines. For instance, FIG. 3A shows "id": 1 associated with a start and end time of about 20.65 seconds and with a "start-of-line" or "SOL" label (indicated by "text": "<SOL>"), indicating that the start of the following sentence or line of lyrics is temporally located at about 20.65 seconds. Similar outputs may be generated by the first machine learning model 104 to indicate the ends of sentences or lyric lines (e.g., using "end-of-line" or "EOL" labels). In some implementations, the first machine learning model 104 generates information for entire lines of lyrics, such as lyric line index, start and end times for entire lines, text/lyrics for entire lines, identified language, the quantity of words in each line of lyrics, etc. In some implementations, for each detected line of lyrics, the first machine learning model 104 may generate word-level information for the words that form the line of lyrics, such as word index, the characters that form the word, the start time, the end time, the duration, the number of sub-word units that form the word, etc. In some implementations, for each sub-word unit (e.g., syllable, phoneme, etc.) that forms a word, the first machine learning model 104 may generate sub-word unit information such as sub-word unit index, characters that form the sub-word unit, start time, end time, duration, etc.

In some implementations, the second machine learning model 106 can be configured to identify chord labels in a time-aligned manner by analyzing and classifying the harmonic structure of the input audio content 102. The second machine learning model 106 can rely on a feature extraction stage that converts the input audio into a time-frequency representation such as a short-time Fourier transform (STFT) spectrogram, constant-Q transform (CQT), mel spectrogram, or other representation that captures the harmonic and tonal content of the input audio. The feature extraction stage can utilize CNNs, RNNs, transformers, CRNNs, or other architectures. The second machine learning model 106 can frame the generation of output chord predictions as a sequence classification problem to generate chord labels (e.g., C major, G minor, A7, etc.) for each time frame or segment of the input audio content 102. The second machine learning model 106 may utilize a classification layer that maps the extracted features to a set of predefined chord classes, and/or the second machine learning model 106 may utilize a sequence-to-sequence approach to ensure that the predicted sequence of chords is musically coherent. The second machine learning model 106 may be trained via supervised learning using a labeled dataset of audio tracks with paired with corresponding chord names/labels/annotations (e.g., represented in chord lab files or other formats). Data augmentation techniques may be applied to the training dataset to increase model robustness, such as pitch shifting, time stretching, or applying noise to simulate different recording conditions. In some instances, transfer learning is used to train the second machine learning model 106, where pre-trained audio feature extraction models are fine-tuned for chord recognition. Evaluation of performance of the second machine learning model 106 can be conducted using metrics such as chord recognition accuracy (CRA). FIG. 1 conceptually depicts output 114 of the second machine learning model 106, including chord labels 116 and chord label timestamps 118.

FIG. 3B illustrates a representation of example output 114 of the second machine learning model 106, with each separate chord label 116 and associated chord label timestamp 118 being separated by braces. In the example shown in FIG. 3B, each individual chord label is associated with a respective chord name (denoted by "prev_chord") that defines the chord determined by the second machine learning model 106. FIG. 3B also illustrates that each individual chord name can be represented in various ways, such as a complex jazz chord (denoted by "chord_complex jazz"), a simple jazz chord (denoted by "chord_simple_jazz"), a complex pop chord (denoted by "chord_complex pop"), and a simple pop chord (denoted by "chord_simple_pop").

Additionally, similar to the first machine learning model 104, the second machine learning model 106 may output timestamp information associated with each detected chord label. As shown in FIG. 3B, each detected chord label is displayed in association with a current beat time (denoted as "curr_beat_time"). In some embodiments, the second machine learning model 106 may output timestamp information comprising a start, end time, a beat identifier, duration, and/or other time information. In some implementations, the second machine learning model 106 is configured to perform beat, measure, and/or bar detection (e.g., obtaining beat-level or measure/bar-level timestamps), and may index the detected chords to corresponding measures or bars (or beats within measures or bars).

FIG. 1 conceptually depicts the output 108 of the first machine learning model 104 and the output 114 of the second machine learning model 106 being processed by a matching module 120, which may be configured to temporally match or align chord labels 116 with lyric labels 110 based on their timestamps 118 and 112, respectively. For instance, the matching module 120 may determine, for at least one particular chord label of the set of chord labels 116, a corresponding lyric label of the set of lyric labels 110 based on temporal correspondences between respective timestamps of the particular chord label and the lyric labels. In some instances, the corresponding lyric label selected for a particular chord label is the lyric label that is associated with a timestamp with a highest similarity to the timestamp associated with the particular chord label (e.g., based on difference metrics calculated between the timestamps of the particular chord label and the lyric labels). Similarly, the matching module 120 may determine, for at least one particular lyric label of the set of lyric labels, a corresponding chord label of the set of chord labels based on temporal correspondences between respective timestamps of the particular lyric label the chord labels. FIG. 1 conceptually depicts output 122 of the matching module 120, which depicts chord label 116A aligned or matched with lyric label 110A based on temporal similarity of the timestamps of the chord label 116A and the lyric label 110A. FIG. 1 also illustrates the output 122 as including other matchings of chord labels 116B and 116C with lyric labels 110B and 110C, respectively, based on their timestamps. In some implementations, the procedure for aligning lyrics with corresponding beats, chords, and/or measures as described herein may be performed using phonemic representations (e.g., where the first machine learning model outputs phonemic representations with time identifiers for alignment to time identifiers of identified chords, measures, beats, etc.), which may enable language-agnostic operation.

The ellipsis within the output 122 shown in FIG. 1 indicates that the output 122 can comprise any quantity of matched/aligned chord labels and lyric labels. In some instances, the matching module 120 is configured to search for a matching lyric label for each chord label using a predefined temporal window (e.g., 25 seconds, 0.5 seconds, 0.75 seconds, 1 second, 2 seconds, etc.). In some instances, fewer than all chord labels of the set of chord labels become matched/aligned with a corresponding lyric label of the set of lyric labels (e.g., prelude or postlude chords, chords that are part of a solo, etc.). In some instances, a matching module 120 may utilize one or more rules or heuristics to resolve ambiguities where a chord or lyric is determined to temporally match with multiple lyrics or chords (e.g., where an audio file includes multiple vocalists, sets of lyrics, or instruments, a lead vocal or selected instrument designation may be used to constrain the determination of matching/aligned chords and lyrics). In one or more embodiments, the matching module 120 may use additional information (e.g., end timestamp, identifiers, user feedback) to match the chord labels and lyric labels.

In the example shown in FIGS. 3A and 3B, the "id": 2 lyric label (e.g., including the "Psych" syllable-level label) may be selected as a corresponding lyric (or matching lyric or aligned lyric) for the "A: min" chord detected at "curr_beat_time": 20.64 based on the similarity between the start timestamp of the "id": 2 lyric (e.g., 20.65) and the beat time of the chord (e.g., 20.64). The matching module may determine (or attempt to determine) a temporally matched/aligned lyric for each chord of the set of chords obtained via the second machine learning model.

Figure 4:
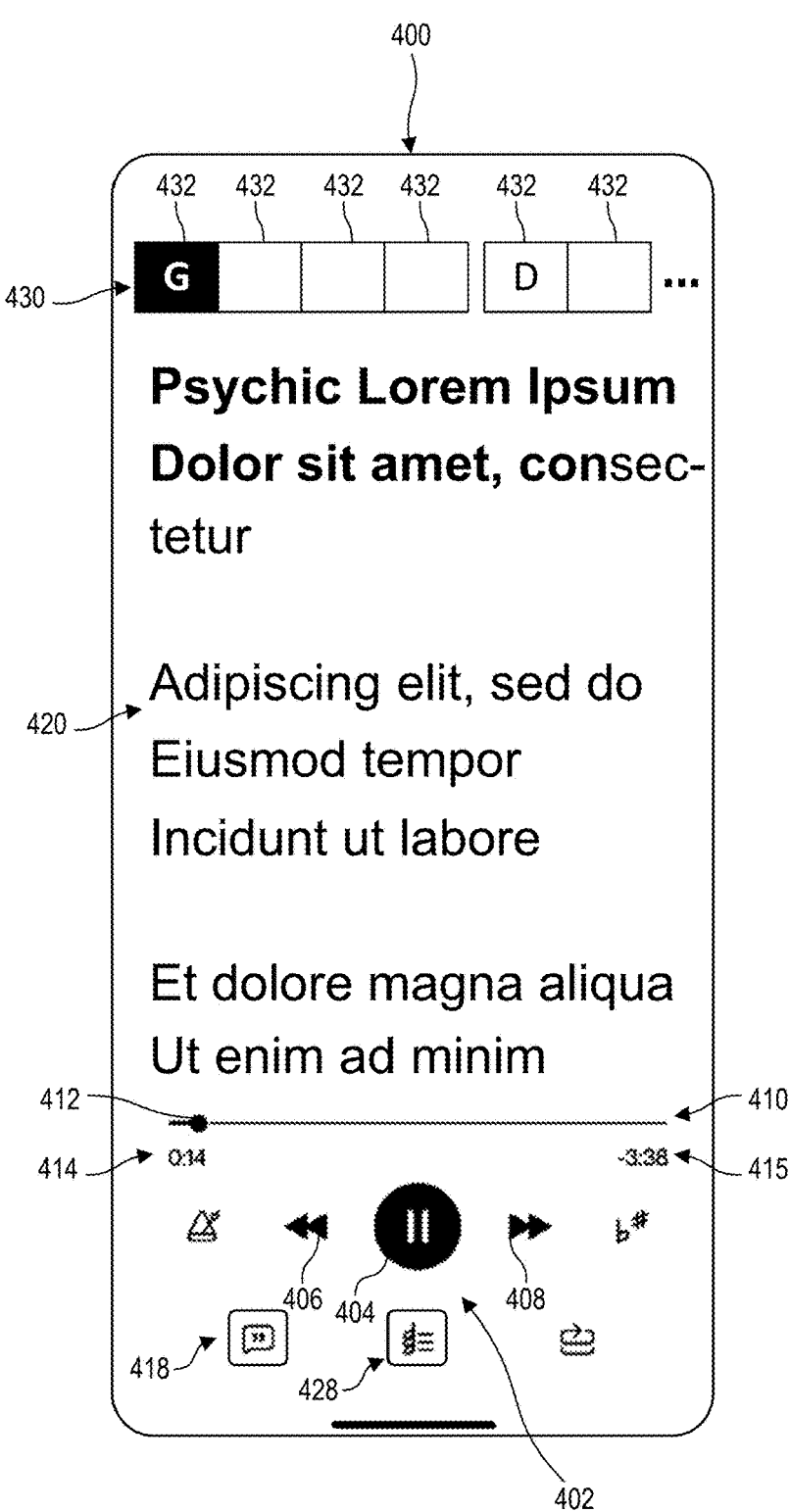
FIGS. 4 and 5 illustrate example user interfaces that include various elements for interacting with audio content and presenting lyric and chord outputs associated with audio content.

FIG. 1 conceptually depicts that the output 122 may be used to generate a display 124 that visually correlates the temporal alignment between chord labels and lyric labels. The display 124 may be presented on a user interface frontend (e.g., a music application executing on a user device). FIG. 4 illustrates an example user interface 400 that includes various elements for interacting with audio content and/or presenting outputs associated with audio content (e.g., for showing a display 124 based on output 122). For instance, user interface 400 can be presented on a user interface frontend executing on a device after selection of the My Recording file of the user interface 200 discussed hereinabove with reference to FIG. 2. The user interface 400 of FIG. 4 includes playback controls 402, which include a play/pause element 404, navigation elements 406 and 408 (e.g., for navigating or skipping forward or backward in time by predetermined time intervals, such as 5 seconds, 10 seconds, etc.), and a playback navigation bar 410 (e.g., for indicating playback progress and facilitating scrubbing/ navigating through the selected audio content). The playback controls 402 further include a playback position marker 412 associated with the navigation bar 410 to indicate the current playback position for playing back the selected audio content (e.g., the My Recording audio file). The user interface 400 further includes time indicators 414 and 415, which can indicate the current playback time for playback of the selected audio content (e.g., time indicator 414), the remaining playback duration of the selected audio content (e.g., time indicator 415), the total duration of the selected audio content, and/or other time-related information.

The example user interface 400 shown in FIG. 4 furthermore includes a lyrics element 418, which can comprise a selectable element for facilitating presentation of lyric content 420 on the user interface 400. The lyric content 420 shown in FIG. 4 includes lyric segments (e.g., lyrical words divided into lines, phrases, sentences, stanzas, verses, etc.) generated based on the lyric labels 110 generated via the first machine learning model 104. The lyric content 420 can be presented as a scrolling list (e.g., vertically scrollable in the example shown in FIG. 4) that the user can navigate through via user input and/or that can automatically scroll during playback of the selected audio content.

FIG. 4 also illustrates the user interface 400 as including a chords element 428, which can comprise a selectable element for facilitating presentation of chord content 430 on the user interface 400. The chord content 430 shown in FIG. 4 includes chord names (e.g., root notes such as "G" or "D" and/or one or more modifiers, extensions, alterations, etc.) generated based on the chord labels 116 generated via the second machine learning model 106. In the example shown in FIG. 4, the chord names of the chord content 430 are positioned within beat indicators 432 that are divided/spaced into measures (e.g., with 4 beats in each measure in the example shown in FIG. 4). The presence of a chord name in a particular beat indicator 432 can signal that the named chord is to be played on the indicated beat and/or for the remainder of the measure (e.g., indicating that a named chord applies or is incorporated to all subsequent beat indicators in the measure). The chord content 430 can be presented as a scrolling list (e.g., horizontally scrollable in the example shown in FIG. 4) that the user can navigate through via user input and/or that can automatically scroll during playback of the selected audio content.

During playback of the selected audio content, the user interface 400 may visually correlate chords from the chord content 430 with lyrics from the lyric content 420 that are determined to temporally correspond to one another (e.g., based on outputs 108, 114, and/or 122, which may be stored in metadata associated with the selected audio content). For instance, during playback of the selected audio content, the user interface 400 may visually emphasize (i) a chord name and/or beat indicator 432 from the chord content 430 and (ii) a lyric from the lyric content 420 to visually indicate that the emphasized chord name and/or beat indicator 432 and the emphasized lyric occur or are played at substantially the same time in the selected audio content.

In the example shown in FIG. 4, the user interface 400 bolds the text of lyrics of the lyric content 420 that have been or are being sung during playback of the selected audio content, with the syllable "con" being newly bolded to indicate that this syllable is being sung during the playback of the selected audio content (other forms of visual emphasis are possible). The user interface 400 also illustrates a beat indicator 432 including the "G" chord name with a black background and with the text of the chord name in bolded format, indicating that this beat and chord are being played during the playback of the selected audio content (other forms of visual emphasis are possible). As playback progresses, subsequent beat indicators 432 (and/or accompanying chord names, where present) may be visually emphasized in temporal alignment with corresponding lyrics, such as the beat indicator 432 that follows the "G" chord name (where a G chord will continue to be played) and the lyric that follows the newly bolded "con" syllable (e.g., the "sec" syllable). Visually emphasizing chord names and/or beat indicators in temporal alignment with visually emphasized lyrics during playback can assist users in synchronizing their singing and/or musical instrument playing with selected songs, which can improve music learning and practice in numerous scenarios.

Figure 5:
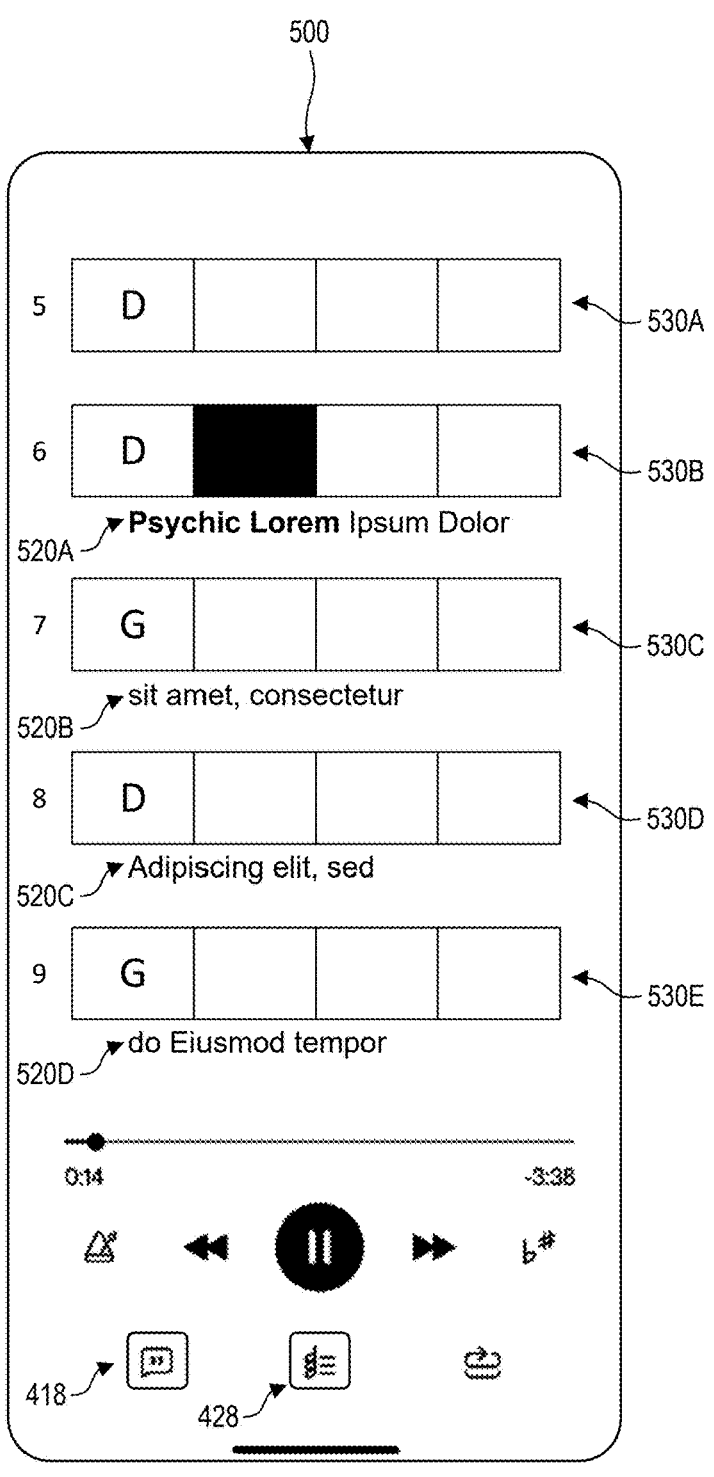

In some implementations, a display 124 generated based on outputs 108, 114, and/or 122 can visually correlate temporally corresponding lyrics and chords regardless of playback, which can additionally or alternatively assist users in learning the synchronization of lyrics with chords. For instance, FIG. 5 illustrates a user interface 500 showing a display generated based on the outputs 108, 114, and/or 122 that includes an interleaving (e.g., an at least partial interleaving) of lyric segments 520A, 520B, 520C, and 520D with chord content 530A, 530B, 530C, 530D, 530E (e.g., including chord names and/or beat indicators, divided into numerically labeled measures or bars "5", "6", "7", etc.). In the example shown in FIG. 5, the first lyric label (e.g., syllable, or other division) of each lyric segment 520A, 520B, 520C, and 520D is paired with its matching chord name (or measures/bar), thereby visually emphasizing the temporal correspondence between lyrics and chords to users. For instance, the user interface 500 illustrates the lyric syllable "Psych" of lyric segment 520A is paired with (e.g., arranged proximate to: below in the example of FIG. 5) the chord name "D" of chord content 530B (e.g., in measure 6), indicating that the lyric syllable "Psych" is sung while the chord D major (or measure 6) is played during playback of the selected audio content. Similarly, the user interface 500 illustrates the chord name "G" of chord content 530C (arranged below lyric segment 520A) paired with lyric segment 520B (or with the lyric syllable "sit" of lyric segment 520B), indicating that the "sit" syllable of lyric segment 520B is sung while the chord G major is played during playback of the selected audio content. Similar to user interface 400, user interface 500 can be configured to visually emphasize lyrics and/or beat indicators during playback of the selected audio content.

As noted above, a system may determine beat, measure, and/or bar-level timing information, which may indicate start and/or end timestamps associated with bars or measures of selected audio content. In some implementations, a system may utilize the bar and/or measure-level time information to determine how to align lyrics with measures of the selected audio content. For instance, lyric words determined to comprise a start time and an end time that is within the temporal boundaries of a particular measure may become paired with the particular measure (e.g., as shown in FIG. 5, where words of lyric segments 520A-520D are paired with corresponding measures 6-9). In some implementations, a lyric word may comprise a start time that is within the temporal boundaries of one measure and an end time that extends into the temporal boundaries of a subsequent measure. In such cases, a system may assess the temporal overlap between the word boundaries and the relevant measure boundaries to determine which measure to pair the word with.

For instance, a system may implement one or more rules indicating that when a threshold percentage (e.g., within a range of about 5% to about 95%) of a duration of a word is within the temporal boundaries of the measure that encompasses the start time of the word, the word may be paired with the measure that encompasses the start time of the word, otherwise the word may be paired with a temporally subsequent measure.

In some implementations, additional processing may be performed on lines of lyrics (e.g., temporally correlated with chords, bars/measures, etc., as shown in FIGS. 4 and 5), such as language translation processing (e.g., where language translation is performed on the lines of lyrics while still preserving the division of the lyric lines).

Chord content and lyric content (e.g., generated based on the outputs 108, 114, and/or 122) can be visually correlated in other ways in accordance with the scope of the present disclosure. For instance, a user interface may display lyric segments with chord names distributed among temporally corresponding lyrics (e.g., as determined based on the output 122), with chord names being spatially aligned with or in spatial proximity to temporally corresponding lyrics.

In some instances, user interfaces presenting a display 124 generated at least partially based on output 122 (e.g., similar to user interfaces 400 and 500) can be configured to receive user input modifying one or more aspects of the representation of the lyrics and/or the chords of the selected audio content. For instance, a user may provide input accepting, rejecting, or modifying the lyrics (or temporal layout of the lyrics), which can be used as or to generate training data for tuning the first machine learning model 104 and/or the matching module 120. Similarly, a user may provide input accepting, rejecting, or modifying the chords (or temporal layout of the chords), which can be used as or to generate training data for tuning the second machine learning model 106 and/or the matching module 120. For instance, a user may drag a representation of a chord or lyric to a different temporal position to align the chord or lyric with a different corresponding lyric or chord, respectfully. Such modifications can be used to fine-tune any models/ modules described herein.

Additionally, a user interface may allow users to save the lyrics and chords locally, on cloud or remote resources, and/or in other memory. A system may allow users to save multiple processed lyric and chord representations for multiple audio files. In some instances, users may seamlessly access a library of processed audio files and navigate among the processed audio files to access representations of lyrics and chords for each processed audio file.

One will appreciate, in view of the present disclosure, that specific aspects and/or functionality of the systems and/or user interfaces described herein are provided by way of example only and are not limiting of the principles described herein. Furthermore, although examples provided herein are focused, in at least some respects, on utilizing a matching module to align chords with lyrics, a user interface display showing extracted chords and lyrics may be presented without performing such a matching operation with a matching module (e.g., with the detected chords and lyrics instead being presented based solely on their respective timestamps and without regard to potential matching).

Figure 6:
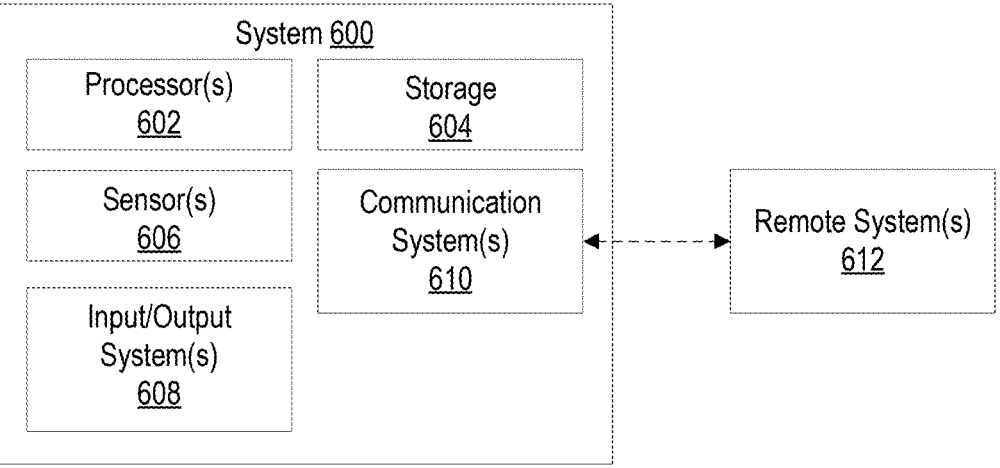
FIG. 6 depicts example components of a system that may comprise or be configurable to perform various embodiments.

FIG. 6 illustrates example components of a system 600 that may comprise or implement aspects of one or more disclosed embodiments. For example, FIG. 6 illustrates an implementation in which the system 600 includes processor(s) 602, storage 604, sensor(s) 606, I/O system(s) 608, and communication system(s) 610. Although FIG. 6 illustrates a system 600 as including particular components, one will appreciate, in view of the present disclosure, that a system 600 may comprise any number of additional or alternative components.

The processor(s) 602 may comprise one or more sets of electronic circuitries that include any number of logic units, registers, and/or control units to facilitate the execution of computer-readable instructions (e.g., instructions that form a computer program). Processor(s) 602 can take on various forms, such as CPUs, NPUs, GPUs, or other types of processing units. Such computer-readable instructions may be stored within storage 604. The storage 604 may comprise physical system memory and may be volatile, non-volatile, or some combination thereof. Furthermore, storage 604 may comprise local storage, remote storage (e.g., accessible via communication system(s) 610 or otherwise), or some combination thereof. Additional details related to processors (e.g., processor(s) 602) and computer storage media (e.g., storage 604) will be provided hereinafter.

In some implementations, the processor(s) 602 may comprise or be configurable to execute any combination of software and/or hardware components that are operable to facilitate processing using machine learning models or other artificial intelligence-based structures/architectures. For example, processor(s) 602 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, transformer networks, generative adversarial networks, liquid state machines, extreme learning machines, echo state networks, deep residual networks, Kohonen networks, support vector machines, neural Turing machines, combinations thereof (or combinations of components thereof), and/or others.

As will be described in more detail, the processor(s) 602 may be configured to execute instructions stored within storage 604 to perform certain actions. In some instances, the actions may rely at least in part on communication system(s) 610 for receiving data from remote system(s) 612, which may include, for example, separate systems or computing devices, sensors, servers, and/or others. The communications system(s) 610 may comprise any combination of software or hardware components that are operable to facilitate communication between on-system components/devices and/or with off-system components/devices. For example, the communications system(s) 610 may comprise ports, buses, or other physical connection apparatuses for communicating with other devices/components. Additionally, or alternatively, the communications system(s) 610 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 6 illustrates that a system 600 may comprise or be in communication with sensor(s) 606. Sensor(s) 606 may comprise any device for capturing or measuring data representative of perceivable phenomenon. By way of non-limiting example, the sensor(s) 606 may comprise one or more image sensors, microphones, thermometers, barometers, magnetometers, accelerometers, gyroscopes, and/or others.

Furthermore, FIG. 6 illustrates that a system 600 may comprise or be in communication with I/O system(s) 608. I/O system(s) 608 may include any type of input or output device such as, by way of non-limiting example, a display, a touch screen, a mouse, a keyboard, a controller, and/or others, without limitation.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "computer-readable recording media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that at least some aspects of the invention may be practiced in network computing environments with many types of computer system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, at least some of the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (AS-SPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

Disclosed embodiments include at least those represented in the following numbered clauses:

Clause 1. A system, the system comprising: one or more processors; and one or more computer-readable recording media that store instructions that are executable by the one or more processors to configure the system to: access audio content; generate a set of lyric labels by processing the audio content using a first machine learning model, wherein each lyric label of the set of lyric labels is associated with a respective lyric label timestamp; generate a set of chord labels by processing the audio content using a second machine learning model, wherein each chord label of the set of chord labels is associated with a respective chord label timestamp; determine a matching lyric label from the set of lyric labels for at least one chord label of the set of chord labels, wherein the matching lyric label is determined based on temporal similarity of the respective chord label timestamp of the at least one chord label to the respective lyric label timestamp of the matching lyric label; generate a display comprising lyric content and chord content that visually correlate the matching lyric label with the at least one chord label; and present the display on a user interface frontend.

Clause 2. The system of clause 1, wherein one or more lyric labels of the set of lyric labels comprise one or more of an identifier element, a word-level label, a syllable-level label, or a phoneme-level label.

Clause 3. The system of clause 1 or clause 2, wherein the respective lyric label timestamp comprises one or more of a start time, an end time, or a duration.

Clause 4. The system of any one of clauses 1-3, wherein the respective chord label timestamp comprises one or more of a beat time, a start time, an end time, or a duration.

Clause 5. The system of any one of clauses 1-4, wherein the respective lyric label timestamp of the matching lyric label comprises a highest similarity to the respective chord label timestamp of the at least one chord label relative to other respective lyric label timestamps of other lyric labels of the set of lyric labels.

Clause 6. The system of clause 5, wherein determining the matching lyric label comprises determining one or more difference metrics between (i) each respective lyric label timestamp of the set of lyric labels and (ii) each respective chord label timestamp of the set of chord labels.

Clause 7. The system of any one of clauses 1-6, wherein the lyric content comprises a plurality of lyric segments based on the set of lyric labels, and wherein the chord content comprises a plurality of chord names based on the set of chord labels.

Clause 8. The system of clause 7, wherein a particular lyric segment of the plurality of lyric segments comprises a particular lyric based on the matching lyric label, and wherein a particular chord name of the plurality of chord names is based on the at least one chord label.

Clause 9. The system of clause 8, wherein the display comprises an interleaving of lyric segments of the plurality of lyric segments with chord names of the plurality of chord names in the display.

Clause 10. The system of clause 9, wherein the particular lyric segment is paired with the particular chord name in the interleaving of the lyric segments with the chord names to visually correlate the matching lyric label with the at least one chord label.

Clause 11. The system of any one of clauses 8-10, wherein the instructions are executable by the one or more processors to configure the system to cause playback of the audio content while presenting the display.

Clause 12. The system of clause 11, wherein the instructions are executable by the one or more processors to configure the system to visually emphasize the particular chord name and the particular lyric of the particular lyric segment during the playback of the audio content to visually correlate the matching lyric label with the at least one chord label.

Clause 13. A system, the system comprising: one or more processors; and one or more computer-readable recording media that store instructions that are executable by the one or more processors to configure the system to: access audio content; generate a set of lyric labels by processing the audio content using a first machine learning model, wherein each lyric label of the set of lyric labels is associated with a respective lyric label timestamp; generate a set of chord labels by processing the audio content using a second machine learning model, wherein each chord label of the set of chord labels is associated with a respective chord label timestamp; determine a matching chord label from the set of chord labels for at least one lyric label of the set of lyric labels, wherein the matching chord label is determined based on temporal similarity of the respective lyric label timestamp of the at least one lyric label to the respective chord label timestamp of the matching chord label; generate a display comprising lyric content and chord content that visually correlate the matching chord label with the at least one lyric label; and present the display on a user interface frontend.

Clause 14. The system of clause 13, wherein the lyric content comprises a plurality of lyric segments based on the set of lyric labels, and wherein the chord content comprises a plurality of chord names based on the set of chord labels.

Clause 15. The system of clause 14, wherein a particular chord name of the plurality of chord names is based on the matching chord label, and wherein a particular lyric of a particular lyric segment of the plurality of lyric segments is based on the at least one lyric label.

Clause 16. The system of clause 15, wherein the display comprises an interleaving of lyric segments of the plurality of lyric segments with chord names of the plurality of chord names in the display.

Clause 17. The system of clause 16, wherein the particular chord name is paired with the particular lyric segment in the interleaving of the lyric segments with the chord names to visually correlate the matching chord label with the at least one lyric label.

Clause 18. The system of any one of clauses 15-17, wherein the instructions are executable by the one or more processors to configure the system to cause playback of the audio content while presenting the display.

Clause 19. The system of clause 18, wherein the instructions are executable by the one or more processors to configure the system to visually emphasize the particular chord name and the particular lyric of the particular lyric segment during the playback of the audio content to visually correlate the matching chord label with the at least one lyric label.

Clause 20. A method, the method comprising: accessing audio content; generating a set of lyric labels and a set of chord labels by processing the audio content using one or more artificial intelligence models, wherein each lyric label of the set of lyric labels is associated with a respective lyric label timestamp, and wherein each chord label of the set of chord labels is associated with a respective chord label timestamp; determining a matching lyric label from the set of lyric labels for at least one chord label of the set of chord labels, wherein the matching lyric label is determined based on temporal similarity of the respective chord label timestamp of the at least one chord label to the respective lyric label timestamp of the matching lyric label; generating a display comprising lyric content and chord content that visually correlate the matching lyric label with the at least one chord label; and presenting the display on a user interface frontend.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is currently claimed is:

1. A system, the system comprising:
one or more processors; and
one or more computer-readable recording media that store instructions that are executable by the one or more processors to configure the system to:
access audio content;
generate a set of lyric labels by processing the audio content using one or more machine learning models, wherein each lyric label of the set of lyric labels is associated with a respective lyric label timestamp;
generate a set of chord labels by processing the audio content using the one or more machine learning models, wherein each chord label of the set of chord labels is associated with a respective chord label timestamp;
determine a matching lyric label from the set of lyric labels for at least one chord label of the set of chord labels, wherein the matching lyric label is determined based on temporal similarity of the respective chord label timestamp of the at least one chord label to the respective lyric label timestamp of the matching lyric label;
generate a display comprising lyric content and chord content that visually correlate the matching lyric label with the at least one chord label, wherein the lyric content comprises a plurality of lyric segments based on the set of lyric labels, wherein the chord content comprises a plurality of chord names based on the set of chord labels, wherein a particular lyric segment of the plurality of lyric segments comprises a particular lyric based on the matching lyric label, and wherein a particular chord name of the plurality of chord names is based on the at least one chord label, wherein the particular chord name and the particular lyric are presented in the display using a first format;
present the display on a user interface frontend;
cause playback of the audio content while presenting the display; and
during playback of the audio content, visually emphasize the particular chord name and the particular lyric to temporally correlate the particular chord name with the particular lyric by presenting the particular chord name and the particular lyric in the display using a second format that is different from the first format.

2. The system of claim 1, wherein one or more lyric labels of the set of lyric labels comprise one or more of an identifier element, a word-level label, a syllable-level label, or a phoneme-level label.

3. The system of claim 1, wherein the respective lyric label timestamp comprises one or more of a start time, an end time, or a duration.

4. The system of claim 1, wherein the respective chord label timestamp comprises one or more of a beat time, a start time, an end time, or a duration.

5. The system of claim 1, wherein the respective lyric label timestamp of the matching lyric label comprises a highest similarity to the respective chord label timestamp of the at least one chord label relative to other respective lyric label timestamps of other lyric labels of the set of lyric labels.

6. The system of claim 5, wherein determining the matching lyric label comprises determining one or more difference metrics between (i) each respective lyric label timestamp of the set of lyric labels and (ii) each respective chord label timestamp of the set of chord labels.

7. The system of claim 1, wherein the display comprises an interleaving of lyric segments of the plurality of lyric segments with chord names of the plurality of chord names in the display.

8. The system of claim 7, wherein the particular lyric segment is paired with the particular chord name in the interleaving of the lyric segments with the chord names to visually correlate the matching lyric label with the at least one chord label.

9. The system of claim 1, wherein the second format comprises a bolded representation of the particular chord name and the particular lyric.

10. The system of claim 1, wherein the display further comprises a beat indicator comprising a plurality of divisions, and wherein the instructions are executable by the one or more processors to configure the system to, during playback of the audio content, modify presentation of a division of the plurality of divisions, wherein the division temporally correlated with the particular chord name or the particular lyric.

11. A system, the system comprising:
one or more processors; and
one or more computer-readable recording media that store instructions that are executable by the one or more processors to configure the system to:
access audio content;
generate a set of lyric labels by processing the audio content using one or more machine learning models, wherein each lyric label of the set of lyric labels is associated with a respective lyric label timestamp;
generate a set of chord labels by processing the audio content using the one or more machine learning models, wherein each chord label of the set of chord labels is associated with a respective chord label timestamp;
determine a matching chord label from the set of chord labels for at least one lyric label of the set of lyric labels, wherein the matching chord label is determined based on temporal similarity of the respective lyric label timestamp of the at least one lyric label to the respective chord label timestamp of the matching chord label;
generate a display, wherein the display comprises:
lyric content and chord content that visually correlate the matching chord label with the at least one lyric label; and
a beat indicator, wherein the beat indicator comprises a plurality of divisions, wherein the matching chord label is disposed within a division of the plurality of divisions of the beat indicator; and
present the display on a user interface frontend.

12. The system of claim 11, wherein the lyric content comprises a plurality of lyric segments based on the set of lyric labels, and wherein the chord content comprises a plurality of chord names based on the set of chord labels.

13. The system of claim 12, wherein a particular chord name of the plurality of chord names is based on the matching chord label, and wherein a particular lyric of a particular lyric segment of the plurality of lyric segments is based on the at least one lyric label.

14. The system of claim 13, wherein the display comprises an interleaving of lyric segments of the plurality of lyric segments with chord names of the plurality of chord names in the display.

15. The system of claim 14, wherein the particular chord name is paired with the particular lyric segment in the interleaving of the lyric segments with the chord names to visually correlate the matching chord label with the at least one lyric label.

16. The system of claim 13, wherein the instructions are executable by the one or more processors to configure the system to cause playback of the audio content while presenting the display.

17. The system of claim 16, wherein the instructions are executable by the one or more processors to configure the system to visually emphasize the particular chord name and the particular lyric of the particular lyric segment during the playback of the audio content to visually correlate the matching chord label with the at least one lyric label.

18. A method, the method comprising:

accessing audio content;

generating a set of lyric labels and a set of chord labels by processing the audio content using one or more artificial intelligence models, wherein each lyric label of the set of lyric labels is associated with a respective lyric label timestamp, and wherein each chord label of the set of chord labels is associated with a respective chord label timestamp;

determining a matching lyric label from the set of lyric labels for at least one chord label of the set of chord labels, wherein the matching lyric label is determined based on temporal similarity of the respective chord label timestamp of the at least one chord label to the respective lyric label timestamp of the matching lyric label;

generating a display comprising lyric content and chord content that visually correlate the matching lyric label with the at least one chord label, wherein the lyric content comprises a plurality of lyric segments based on the set of lyric labels, wherein the chord content comprises a plurality of chord names based on the set of chord labels, wherein the lyric content is presented in the display as a first scrolling list scrollable in a first direction, and wherein the chord content is presented in the display as a second scrolling list scrollable in a second direction that is different from the first direction; and presenting the display on a user interface frontend.

19. The method of claim 18, wherein the first direction comprises a vertical direction, and wherein the second direction comprises a horizontal direction.

* * * * *